US011747792B1

(12) United States Patent
Mulligan

(10) Patent No.: US 11,747,792 B1
(45) Date of Patent: Sep. 5, 2023

(54) REMOTELY MANAGING AND UPDATING INTERNET OF THINGS DEVICE CONFIGURATION LOGIC

(71) Applicant: Applied Information, Inc., Suwanee, GA (US)

(72) Inventor: Bryan Patrick Mulligan, Suwanee, GA (US)

(73) Assignee: Applied Information, Inc., Suwanee, GA (US)

( * ) Notice: Subject to any disclaimer, the term of this patent is extended or adjusted under 35 U.S.C. 154(b) by 0 days.

(21) Appl. No.: 18/167,522

(22) Filed: Feb. 10, 2023

Related U.S. Application Data

(60) Provisional application No. 63/308,748, filed on Feb. 10, 2022.

(51) Int. Cl.
  *G05B 19/418* (2006.01)
  *H04L 61/2517* (2022.01)
  *H04L 69/16* (2022.01)

(52) U.S. Cl.
  CPC .... *G05B 19/41855* (2013.01); *H04L 61/2517* (2013.01); *H04L 69/162* (2013.01)

(58) Field of Classification Search
  CPC .......... G05B 19/41855; H04L 61/2517; H04L 69/162
  USPC ....................................................... 709/224
  See application file for complete search history.

(56) References Cited

U.S. PATENT DOCUMENTS

| | | | |
|---|---|---|---|
| 10,013,707 B1 * | 7/2018 | Burcham | G06Q 30/02 |
| 11,463,525 B1 * | 10/2022 | Rath | H04L 41/22 |
| 11,665,131 B1 * | 5/2023 | Subramanian | H04L 67/1004 |
| | | | 709/245 |
| 2013/0211546 A1 * | 8/2013 | Lawson | H04L 67/02 |
| | | | 700/9 |
| 2016/0364223 A1 * | 12/2016 | Vandikas | G06Q 20/3825 |
| 2017/0187807 A1 * | 6/2017 | Clernon | H04L 67/34 |
| 2018/0109650 A1 * | 4/2018 | Berdy | H04L 67/34 |
| 2018/0139056 A1 * | 5/2018 | Imai | H04L 9/3247 |
| 2018/0184145 A1 * | 6/2018 | Pichon | H04N 21/25808 |
| 2019/0373472 A1 * | 12/2019 | Smith | H04W 12/108 |
| 2020/0301693 A1 * | 9/2020 | Patel | H04W 4/80 |
| 2020/0302372 A1 * | 9/2020 | Ghatak | G06Q 10/00 |

(Continued)

*Primary Examiner* — Tauqir Hussain
(74) *Attorney, Agent, or Firm* — Morris, Manning & Martin, LLP; Daniel E. Sineway, Esq.

(57) ABSTRACT

Systems and methods are disclosed for remotely updating configuration logic on Internet of Things (IoT) devices located physically proximate to industrial systems equipment. The IoT devices are configured to monitor and detect outputs, such as sensor data, corresponding to the industrial systems equipment, and the IoT devices are further configured to operate as gateway devices through which communications are routed between a remote computing system and the industrial systems equipment. The IoT devices operate according to configuration files generated at the remote computing system and transmitted to the IoT devices. The IoT devices are notified by the remote computing system of subsequent updates to their respective configuration files. Responsive to receiving a configuration file update notice, an IoT device may establish a back-channel communication link to the remote computing system across which the updated configuration file is identified and retrieved based at least on an updated timestamp.

20 Claims, 5 Drawing Sheets

(56) References Cited

U.S. PATENT DOCUMENTS

| | | | |
|---|---|---|---|
| 2021/0019133 A1* | 1/2021 | Rusev | H04L 41/20 |
| 2021/0105626 A1* | 4/2021 | Olshinka | H04W 12/06 |
| 2021/0119865 A1* | 4/2021 | Dao | H04L 12/2814 |
| 2021/0144422 A1* | 5/2021 | Wagner | H04N 21/4131 |
| 2021/0173709 A1* | 6/2021 | Rusev | G06F 9/5005 |
| 2021/0191826 A1* | 6/2021 | Duraisingh | H04L 41/0893 |
| 2021/0218571 A1* | 7/2021 | Ansari | H04M 15/705 |
| 2021/0359543 A1* | 11/2021 | Naeem | G07F 15/003 |
| 2021/0405993 A1* | 12/2021 | Nagarathnam | H04L 63/123 |
| 2022/0030402 A1* | 1/2022 | Bartholic | G06F 13/4282 |
| 2022/0095079 A1* | 3/2022 | Volkerink | H04W 4/029 |
| 2022/0141666 A1* | 5/2022 | Armerding | H04W 12/06 |
| | | | 726/12 |
| 2022/0155744 A1* | 5/2022 | Zimmerman | G05B 19/05 |
| 2022/0263915 A1* | 8/2022 | Yang | H04L 41/082 |
| 2022/0295281 A1* | 9/2022 | Gharout | H04W 12/45 |
| 2023/0017776 A1* | 1/2023 | Shenoy | H04L 9/3263 |
| 2023/0057193 A1* | 2/2023 | Ansari | H04L 67/566 |

\* cited by examiner

Device ID: 20128

| General | Industrial System 1 |
|---|---|

Time Since Last Contact: # Days, # Hours, # Seconds; MM/DD/YY HH:MM:SS AM/PM

Logic Table Update Timestamp: MM/DD/YY HH:MM:SS AM/PM

420 — Outputs | 416 — Logic Table | 418 — PID Control | 422 — Hour Meter

| | | IF | | | THEN | | | |
|---|---|---|---|---|---|---|---|---|
| 424 → Row | Input(N) | Logic Operator | Input Value | | Output(M) | Value | Comment | New Row |
| 1 | Digital Input(1) | Equal | True(0) | | Digital Output(1) | True | On | Edit/Delete |
| 2 | Digital Input(1) | Equal | False(0) | | Digital Output(1) | False | Off | Edit/Delete |

[Save] 414    [Save & Publish] 426    [Refresh]

*FIG. 4B*

REMOTELY MANAGING AND UPDATING INTERNET OF THINGS DEVICE CONFIGURATION LOGIC

CROSS REFERENCE TO RELATED APPLICATIONS

This application is a Non-Provisional Patent Application of, and claims the benefit of and priority to, U.S. Provisional Patent Application No. 63/308,748, filed on Feb. 10, 2022, and entitled "REMOTELY MANAGING AND UPDATING INTERNET OF THINGS DEVICE CONFIGURATION LOGIC," the disclosure of which is incorporated by reference as if the same were set forth herein in its entirety.

This application further incorporates by reference the disclosures of the following patent applications, as if the same were set forth herein in their entireties:

U.S. Non-Provisional patent application Ser. No. 17/579,204, filed on Jan. 19, 2022, and entitled "SYSTEMS, METHODS, AND DEVICES FOR COMMUNICATION BETWEEN TRAFFIC CONTROLLER SYSTEMS AND MOBILE TRANSMITTERS AND RECEIVERS;"

U.S. Non-Provisional patent application Ser. No. 17/579,200, filed on Jan. 19, 2022, and entitled "SYSTEMS, METHODS, AND DEVICES FOR COMMUNICATION BETWEEN TRAFFIC CONTROLLER SYSTEMS AND MOBILE TRANSMITTERS AND RECEIVERS;" and U.S. Non-Provisional patent application Ser. No. 17/579,193, filed on Jan. 19, 2022, and entitled "SYSTEMS, METHODS, AND DEVICES FOR COMMUNICATION BETWEEN TRAFFIC CONTROLLER SYSTEMS AND MOBILE TRANSMITTERS AND RECEIVERS."

TECHNICAL FIELD

The present systems and methods relate generally to internet of things (IoT) devices, and more particularly to remotely managing and updating computer-implementable configuration logic on IoT devices.

BACKGROUND

The paradigm shift into IoT computing has changed the ways in which businesses collect and process data. A primary recipient of developers' attention in the growing IoT industry is the consumer devices sector. For example, many refrigerators, speakers, and televisions found in one's home are interconnected over a local network, and also likely connected to a remote system operated by the device manufacturer. The availability of local networks in the home, as well as the size of the overall consumer devices market in general, makes consumer devices the likely target for IoT development. However, IoT development in other sectors, such as industrials, energy, and manufacturing, has not grown at the same rate as the consumer sector.

The environments in which industrial, energy, and manufacturing-related data is collected are typically far harsher than the average consumer's living room. Therefore, making these sectors interconnected requires much more than the basic sensors and generic computing equipment typically found in consumer devices. Moreover, much of the equipment in these sectors is older equipment developed on a much longer life cycle than the latest consumer device, and thus solving the interconnectivity problem is not as simple as replacing preexisting equipment with the latest offering. Further, even if existing equipment in these sectors could be retrofitted with a sensor or the like, the problem of collecting and processing this data, and making changes to the logic controlling those processes, is still present.

Therefore, there exists a long-felt but unresolved need for systems and methods for remotely managing and updating IoT device configuration logic, namely IoT device configuration logic in industrial systems equipment.

BRIEF SUMMARY OF THE DISCLOSURE

Briefly described, and according to one embodiment, aspects of the present disclosure generally relate to systems and methods for remotely managing and updating internet of things (IoT) device configuration logic. In a particular embodiment, the disclosed systems and methods discuss updating computer-implementable logic at one or more IoT devices (or generally any device connected to a wireless or wired communications network), to include a most recent or current version of device execution logic based on an update implemented on a web-based or remote platform. For example, an IoT device may be an electronic computing device operatively connected to industrial equipment, such as power generators, solar panels, trucks, or the like, and furthermore the IoT device may monitor information, such as location, position, power, key switch status, run status, temperature, pressure, and/or flow levels, at the industrial equipment. In certain embodiments, the IoT device includes one or more sensors to detect and measure operating conditions (e.g., temperature, pressure, flow rate, voltage) at the industrial equipment with which it is integrated; however, the IoT device can be configured to also receive data collected by other sensors at or near the industrial equipment.

In various embodiments, the present systems and methods disclose a solution for updating computer-implementable logic at the IoT devices. In various embodiments, each IoT device includes a logic file with computer-implementable/executable instructions for processing data received at the IoT device, as well as instructions for executing other IoT device tasks. In some embodiments, the logic file includes instructions for configuring one or more parameters associated with the industrial equipment monitored by the device. In particular embodiments, the logic file includes instructions for triggering an action in response to detecting a particular value above or below a predetermined threshold (e.g., the file may include "power down" instructions in response to detecting a heat level above 100 degrees Fahrenheit, the file may include "power on" instructions to activate a pump in response to detecting a certain level of fluid or gas that exceeds a predetermined threshold).

In at least one embodiment, the present disclosure discusses a method for remotely updating execution logic at a gateway device retrofitted into an industrial equipment environment and operatively configured to monitor a plurality of industrial equipment sensors, the method comprising the steps of: 1) receiving, at a gateway device, a message transmitted from a remote computing system via a primary TCP/IP network connection between the gateway device and the remote computing system, wherein the primary TCP/IP network connection is primarily configured for the gateway device to transmit, to the remote computing system, raw data detected from a plurality of industrial equipment sensors, and wherein the message comprises an indication of an updated version of the gateway device's execution logic, wherein the updated version is stored at a database operatively connected to the remote computing system; 2) in response to receiving the message, establishing a secondary TCP/IP network connection with the remote computing system, wherein the secondary TCP/IP network connection is configured to operate independently from, and contemporaneously with, the primary TCP/IP network connection; 3) retrieving, via the secondary TCP/IP network connection, the updated version of the execution logic from the database, wherein retrieving the updated version of the execution logic comprises: i) querying the database for a configuration file associated with a device identification number corresponding to the gateway device, wherein the configuration file comprises the updated version of the execution logic; and ii) determining that the gateway device's execution logic has been updated based at least on a timestamp corresponding to the updated version of the execution logic; and 4) processing the updated version of the execution logic, wherein processing the updated version of the execution logic comprises replacing a current version of the execution logic stored in memory at the gateway device with the updated version of the execution logic.

In various embodiments, the primary TCP/IP network connection corresponds to a first network socket associated with a first network port, and the secondary network connection corresponds to a second network socket associated with a second network port. In particular embodiments, the secondary network connection comprises a back-channel network connection.

In at least one embodiment, the first network port comprises port number 80 or port number 443 of the Internet Assigned Numbers Authority (IANA) official assignments of port numbers, and the second network port comprises port number 85 of the IANA official assignments of port numbers. In various embodiments, the message comprises a particular port number corresponding to the second network port.

According to various aspects of the present disclosure, the message comprising the indication of the updated version of the gateway device's current execution logic is transmitted in response to a user of the remote computing system adding, removing, and/or editing rules within the gateway device's current execution logic via an electronic computing device operatively connected to the remote computing system. Furthermore, in one embodiment, the gateway device comprises a dynamic IP address.

In particular embodiments, the method further incudes the step of, in response to the gateway device retrieving the updated version of the execution logic from the database operatively connected to the remote computing system, disconnecting from the secondary TCP/IP network connection.

In at least one embodiment, the present disclosure also discusses a system for remotely updating execution logic at a gateway device retrofitted into an industrial equipment environment and operatively configured to monitor a plurality of industrial equipment sensors, comprising: a remote computing system, the remote computing system comprising at least a processor and a database; and a gateway device comprising a processing unit and a memory, wherein the processing unit at the gateway device is operatively configured to: 1) receive, at a gateway device, a message transmitted from a remote computing system via a primary TCP/IP network connection between the gateway device and the remote computing system, wherein the primary TCP/IP network connection is primarily configured for the gateway device to transmit, to the remote computing system, raw data detected from a plurality of industrial equipment sensors, and wherein the message comprises an indication of an updated version of the gateway device's execution logic, wherein the updated version is stored at a database operatively connected to the remote computing system; 2) in response to receiving the message, establish a secondary TCP/IP network connection with the remote computing system, wherein the secondary TCP/IP network connection is configured to operate independently from, and contemporaneously with, the primary TCP/IP network connection; 3) retrieve, via the secondary TCP/IP network connection, the updated version of the execution logic from the database, wherein retrieving the updated version of the execution logic comprises: i) querying the database for a configuration file associated with a device identification number corresponding to the gateway device, wherein the configuration file comprises the updated version of the execution logic; and ii) determining that the gateway device's current execution logic has been updated at least based on a timestamp corresponding to the updated version of the execution logic; and 4) process the updated version of the execution logic, wherein processing the updated version of the execution logic comprises replacing a current version of the execution logic stored in memory at the gateway device with the updated version of the execution logic.

In various embodiments, the primary TCP/IP network connection corresponds to a first network socket associated with a first network port, and the secondary network connection corresponds to a second network socket associated with a second network port. In particular embodiments, the secondary network connection comprises a back-channel network connection.

In at least one embodiment, the first network port comprises port number 80 or port number 443 of the Internet Assigned Numbers Authority (IANA) official assignments of port numbers, and the second network port comprises port number 85 of the IANA official assignments of port numbers. In various embodiments, the message comprises a particular port number corresponding to the second network port.

According to various aspects of the present disclosure, the message comprising the indication of the updated version of the gateway device's current execution logic is transmitted in response to a user of the remote computing system adding, removing, and/or editing rules within the gateway device's current execution logic via an electronic computing device operatively connected to the remote computing system. Furthermore, in one embodiment, the gateway device comprises a dynamic IP address.

In particular embodiments, the processing unit at the gateway device is further operatively configured to disconnect from the secondary TCP/IP network connection in response to retrieving the updated version of the execution logic from the database operatively connected to the remote computing system.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 4B is a screenshot of a remote platform, according to one aspect of the present disclosure.

DETAILED DESCRIPTION

Figure 1:
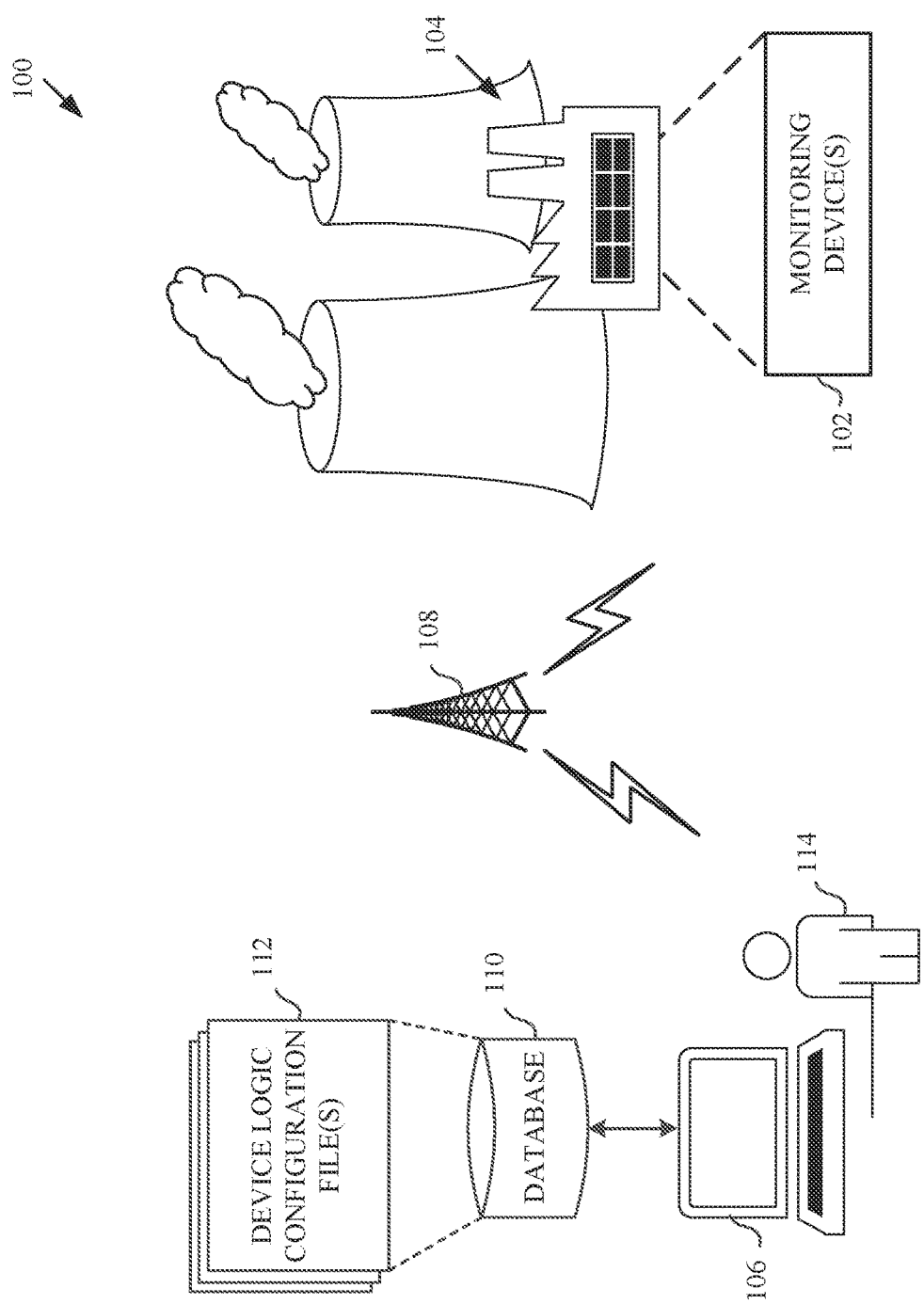
FIG. 1 is a diagram of an exemplary system operational environment, according to one aspect of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

According to one embodiment, the present disclosure generally relates to systems and methods for remotely managing and updating internet of things ("IoT") device configuration logic. In a particular embodiment, the disclosed systems and methods discuss updating computer implementable logic at one or more IoT devices (or generally any device connected to a wireless or wired communications network), to include a most recent or current version of device execution logic based on an update implemented on a web-based or remote platform. For example, the IoT device may be an electronic computing device operatively connected to industrial equipment such as power generators, solar panels, or trucks, and furthermore the IoT device may monitor information, such as location, position, power, key switch status, run status, temperature, pressure, and/or flow levels, at or near the industrial equipment. In certain embodiments, the IoT device includes one or more sensors to detect and measure operating conditions (e.g., temperature, pressure, flow rate, voltage) at the industrial equipment with which it is integrated; however, the IoT device is also configured to receive data collected by other sensors at the industrial equipment.

In various embodiments, the present systems and methods disclose a solution for updating computer implementable logic at the IoT devices. In various embodiments, each IoT device includes a logic file with computer implementable/ executable instructions for processing data received at the IoT device, as well as instructions for executing other IoT device tasks. In some embodiments, the logic file includes instructions for configuring one or more parameters associated with the industrial equipment monitored by the device. In particular embodiments, the logic file includes instructions for triggering an action in response to detecting a particular value above or below a predetermined threshold (e.g., the file may include "power down" instructions in response to detecting a heat level above a predetermined temperature, such as above 100 degrees Fahrenheit; the file may include "power on" instructions to activate a pump in response to detecting a current level of fluid or gas that exceeds a predetermined threshold).

Exemplary Embodiments

Referring now to the drawings, FIG. 1 is an exemplary system operational environment 100, according to various aspects of the present disclosure. As illustrated in the present embodiment, the system may include one or more IoT monitoring devices 102 (also referred to herein as "IoT devices," "monitoring devices," "gateway devices," or simply as "devices") located at a position physically proximate to industrial equipment 104. In the present embodiment, the industrial equipment 104 is represented as a power plant; however, the devices 102 may be located at, and operatively connected to or integrated with, any appropriate type of industrial equipment (e.g., power generators, solar arrays, compressors, transformers, pumps, conveyors, crushers and shredders, power distributors, power quality equipment, irrigation systems, lighting systems). In various embodiments, the physical distance between the industrial equipment 104 and the devices 102 installed to monitor the same may vary based on system-specific configuration factors, such as sensor/device types executing the monitoring of the equipment, specific types of equipment being monitored, operating conditions, network design constraints, or the like. For example, in at least one embodiment, monitoring devices 102 may be installed within a physical distance such that the monitoring devices 102 and various sensors (or other devices) at the industrial equipment 104 may be within a range (e.g., 100 m, 50 m, 30 m, 20 m, 10 m, etc.) close enough to communicate within the same wireless network (e.g., a local area network, a mesh network) without additional hardware such as signal repeaters, routers, and other network equipment. This exemplary embodiment may be present in a system configuration in which there is a single monitoring device 102 receiving data/readings from a plurality of sensors installed around a single physical location, or where design constraints require for the system to be "lean."

In various embodiments, the monitoring devices 102 at the industrial equipment 104 may be operatively connected over a network 108 to a web-based or remote platform 106 operated by a system administrator/user 114. In particular embodiments, the remote platform 106 includes a server and a software application through which the system administrator 114 may receive and view data readings detected by the monitoring devices 102 installed at the industrial systems 104. In one embodiment, the remote platform 106 may allow for a system administrator 114 to view a real-time status of the industrial equipment 104, adjust operating parameters at the industrial equipment, make other actionable changes based on the received data readings, create and edit device configurations, etc. In at least one embodiment, the remote platform 106 may in fact be "local" to the monitoring devices 102. For example, the remote platform 106 may be maintained and accessible within the same local area network (or other appropriate wireless network) as the monitoring device(s) 102. Accordingly, the remote platform 106 should not be interpreted as being limited to embodiments in which the platform is strictly a cloud-based platform, or other similar remote design implementations.

According to various aspects of the present disclosure, the remote platform 106 may include and/or be operatively connected to a logic database 110. In one embodiment, the logic database 110 may store a plurality of logic files 112, and any other appropriate data for supporting the execution of the system processes discussed herein. In various embodiments, each of the plurality of logic files 112 may include computer-readable and executable instructions (or other appropriate logic) for controlling the data processing and device execution at each monitoring device 102. In a particular embodiment, the remote platform 106 may store configuration files for each monitoring device 102 within a database other than the logic database 110. Further, and in at least one embodiment, the configuration files (e.g., an IOConfiguration.XML file, or the like) for each monitoring device 102 may be stored in one or more separate databases within the remote platform 106, and the configuration files may include the execution logic (e.g., a logic table) for each monitoring device 102. As such, and in certain embodiments, logic for each monitoring device 102 may be stored separately/individually within each device's respective configuration file, or each device's logic may be stored in a centralized database (e.g., a logic database 110).

In particular embodiments, each logic file 112 may be generated by the user 114 at the remote platform 106. In certain embodiments, the logic files may be generated via a graphical user interface ("GUI") accessible via the remote platform 106, and the GUI may include configurable parameters relating to specific industrial systems/equipment components. In one embodiment, the GUI may include drop-down menus, text fields, slide-bars, or other user-input elements corresponding to particular monitoring device component parameters, thus allowing for the system administrator/user 114 to easily configure the execution logic for each monitoring device 102. In at least one example, the GUI may allow for a system administrator to configure a particular monitoring device, based on its device identification number, to include logic relating to voltage inputs received by the particular monitoring device. In this example, the system administrator may create logic statements (similar to "if this, then that" statements, or other techniques for creating logic statements) that compare two input values based on a logic operator. Further aspects of the GUI and logic creation are described in greater detail below in association with FIG. 4.

In various embodiments, communications between the remote platform 106 and the monitoring devices 102 are transmitted and received through the network 108 according to TCP/IP protocols. In particular embodiments, each monitoring device (or a group of monitoring devices) is associated with a dynamic IP address, and the monitoring devices may continuously transmit data (e.g., encrypted HTTP data, HTTPS data, or other data formatted according to appropriate secure application layer communication protocols) corresponding to the industrial equipment they monitor, therefore allowing system administrators 114 to view the status of the devices and the industrial equipment that they monitor in real-time.

In at least one embodiment, the system discussed herein may also be operatively connected to and, to the extent appropriate, leverage a wireless communications system as described in U.S. Non-Provisional application Ser. Nos. 17/579,204, 17/579,200, and 17/579,193, each of which were filed on Jan. 19, 2022, and each of which are entitled "SYSTEMS, METHODS, AND DEVICES FOR COMMUNICATION BETWEEN TRAFFIC CONTROLLER SYSTEMS AND MOBILE TRANSMITTERS AND RECEIVERS," and each of which are incorporated by reference.

According to various aspects of the present disclosure, in response to a system administrator 114 updating device logic via the remote platform 106, each monitoring device to which the updated logic pertains may receive a notification regarding the update, as well as instructions for retrieving the updated logic. In at least one embodiment, to retrieve updated logic from the remote platform 106 (or from the database 110), the monitoring devices 102 may establish a back-channel communication link, or network connection, to the remote platform 106 that is separate and independent from the network connection supporting the transmission of data to the devices' respective dynamic IP addresses. For example, communications between the monitoring devices 102 and the remote platform 106 may typically direct messages (e.g., data packets) to port number 443 (for HTTPS web data) or port number 80 (for HTTP web data) of the web server included in the network 108 (or remote platform 106) facilitating the communication link; however, the monitoring device(s) 102 may establish a back-channel communication session serviced through port number 85 (or any other available and/or unassigned port) of the web server so that the updated logic may be retrieved from the remote platform 106 without interrupting preexisting communication sessions (such as communication sessions occurring over ports numbers 443 or 80). According to various aspects of the present disclosure, the ports may be transmission control protocol (TCP) ports or user datagram protocol (UDP) ports, and the ports may further be numbered according to the Internet Assigned Numbers Authority (IANA) official assignments of port numbers. Moreover, in particular embodiments, the system may be configured such that a web interface configured to facilitate communications through port number 85 may reference the one or more databases 110 that are operatively connected to the remote platform 106 for determining how received and transmitted communications should be routed/serviced. The web interface configured to facilitate communications through port 85 may further reference the one or more databases 110 for device-specific data, I/O's, I/O values, and the like, thus allowing for easier modifications to the monitoring device connections given a modification need only be made at a particular database rather than at the web interface itself (which is a more cumbersome modification process).

Figure 2:
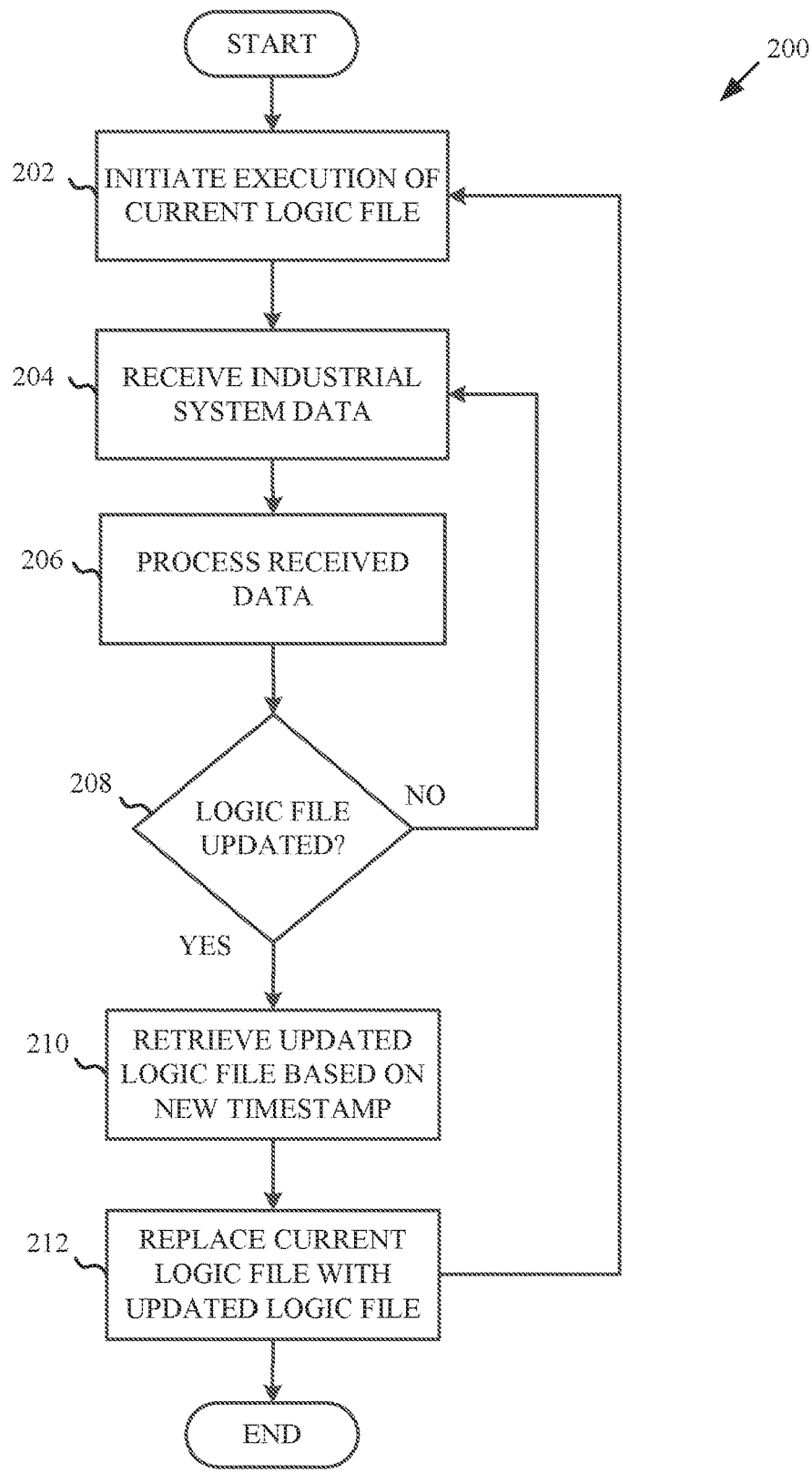
FIG. 2 is a flowchart of an exemplary logic file update process, according to one aspect of the present disclosure.

Turning now to FIG. 2, a flowchart of an exemplary logic file update process 200 is shown, according to one aspect of the present disclosure. As discussed briefly above, the IoT monitoring devices 102 operatively connected to industrial equipment 104 may locally store and execute a logic file, where the logic file includes executable instructions for controlling, monitoring, and managing the industrial equipment and specific configurations associated with the industrial equipment. In various embodiments, the process 200 begins at step 202, where the system initiates execution (or continues an ongoing execution) of a current logic file at one or more particular monitoring devices. According to various aspects of the present disclosure, the current logic file may be an XML file, or another appropriate file format. In at least one embodiment, the monitoring devices may include computer hardware such as a processor, memory, one or more microprocessors, wireless (or wired) communication transmitters and receivers, and/or field programmable gate arrays (FPGA's), thus allowing for the monitoring devices to receive, store, and execute the instructions included in the logic file. In various embodiments, the monitoring devices are configured to parse, identify, and extract logic from the XML file and use that logic to process readings received from the industrial equipment. In some embodiments, the monitoring devices may include separate logic for converting the XML data (e.g., from the generated logic files) into code/instructions executable by the monitoring devices.

Proceeding to step 204, the monitoring device receives one or more readings or parameters from the industrial systems equipment. According to various aspects of the present disclosure, the monitoring devices may be installed at a location physically proximate to the industrial systems equipment, thus allowing for the monitoring devices to receive the one or more parameters from the industrial equipment with minimal latency. In one embodiment, a monitoring device may be operatively connected to one or more sensors at the industrial systems equipment and may further operate as a data hub for the one or more sensors. For example, a monitoring device at a power plant may be operatively connected to a plurality of sensors configured to measure a generated power output (e.g., an industrial systems parameter). Continuing with this example, the plurality of sensors may each measure a respective generated power output and may furthermore transmit the measured power output to the monitoring device, where the monitoring device may proceed to process the received parameters (based on its respective logic file). It should be understood that the monitoring device may be configured to receive any type of parameter, measurement, or data (whether digital or analog). For example, the monitoring device may be configured to integrate with industrial systems and industrial equipment such as power generators, solar panels/arrays, compressors, transformers, pumps, conveyors, crushers, shredders, power distributors, power quality equipment, lighting systems, irrigations systems, or any other device, system, or equipment. In certain embodiments, in addition to being configured to receive data readings from one or more sensors, the monitoring device may include its own integrated or on-board sensors. For example, the monitoring devices may be equipped with one or more temperature sensors, thus allowing for the monitoring devices to determine if an operational environment becomes too hot or cold. The monitoring devices may also be configured to receive readings (such as power output readings) from other sensors that are operatively connected to the monitoring devices. Further, sensors integrated within the monitoring devices may provide redundancy in important data readings and measurements where sensors separate from the monitoring device may fail, lose network connectivity, lose power, or otherwise become unable to operate properly.

According to various aspects of the present disclosure, at step 206, the system may process the received industrial systems equipment data from step 204. In certain embodiments, processing the received industrial systems equipment data may include executing the industrial systems equipment data against, or in accordance with, the current logic file. Referring to the example discussed above in association with step 204, in which the industrial systems equipment data includes temperature readings from one or more temperature sensors, the logic file stored at the monitoring device may include (in computer memory) executable instructions or similar logic for processing temperature readings. In certain embodiments, the logic file may include instructions for converting an analog sensor reading into a corresponding digital representation, the logic file may include instructions for converting temperature scales or units of measure (e.g., converting Fahrenheit to Celsius) or other arithmetic-based logic operations, the logic file may include instructions for calculating an average temperature or another mathematical/statistical determination from a plurality of received temperatures, or any other appropriate instruction. Continuing with this example, the logic file may further include instructions to generate a particular signal (e.g., to turn a connected system on or off) if the average temperature is above or below a predetermined threshold. According to various aspects of the present disclosure, the logic files include instructions to modify and perform calculations on the industrial systems equipment data, thus allowing for the remote platform 106 to receive the data from the monitoring devices 102 in a workable format, while also automatically initiating other downstream actions (e.g., turning a connected system off in response to detecting equipment overheating).

In one embodiment, at step 208, the system determines if an update has been made to the current logic file. According to various aspects of the present disclosure, a system administrator may update the logic file(s) for a particular monitoring device 102 via the remote platform 106. Accordingly, in response to a system administrator updating logic for one or more monitoring devices 102, the remote platform 106 may transmit an alert or notification to the appropriate monitoring devices 102 at which a logic file update is required (or at least available). In one embodiment, the alert/notification includes a message communicating that a logic update has occurred, and the alert may furthermore include monitoring device instructions for retrieving an updated logic file 112 from the logic database 110 at the remote platform 106. Accordingly, the monitoring devices 102 may be alerted in near real-time when updates are made to their respective logic files. In at least one embodiment, the system may also query the remote platform 106 at predetermined and/or periodic time intervals (e.g., daily, hourly, every minute, etc.) to determine if an update has been made to the current logic file (for example, by comparing logic file timestamps). If, at step 208, the system determines that no logic file update has occurred, the system may return to step 204, where the monitoring devices 102 continue to receive (in real-time) data readings from the industrial equipment. However, if the system determines that a logic file update has occurred, the system may proceed to step 210, where the monitoring device 102 retrieves the updated logic.

At step 210, and as briefly mentioned above, the monitoring devices 102 may retrieve updated logic from the logic files 112 stored at the logic database 110 associated with the remote platform 106. In one embodiment, each logic file corresponding to a monitoring device configuration includes an associated timestamp (e.g., a particular time, day, month, and/or year when the device logic was created and/or last updated). In certain embodiments, logic files may include version numbers (e.g., 1.0, 1.1, 2.0) or another appropriate versioning method for representing changes to device execution logic over time. According to various aspects of the present disclosure, in response to receiving the alert or notification from the remote platform 106 indicating that an updated logic file is available, each monitoring device 102 to which the updated logic file pertains may retrieve the updated logic file from the plurality of logic files 112. In a particular embodiment, the monitoring devices 102 may determine which logic file is the updated logic file to be retrieved based on the logic file timestamps. For example, a monitoring device 102 may query its respective configuration file, which, as discussed above in association with the description of FIG. 1 includes a logic table representative of the device's execution logic, and the monitoring device 102 may further determine if the timestamp associated with the logic table has been updated. In response to determining that the logic table timestamp within the configuration file has been updated, the updated logic table may be downloaded and executed by the appropriate monitoring devices 102. In other examples, a monitoring device 102 may query the remote platform 106 and the plurality of logic files 112 for a logic file with a timestamp more recent than the monitoring device's current logic file. In certain embodiments, the monitoring devices 102 may transmit an API request to the remote platform 106 that requests the most recent logic file 112 without comparing timestamps with the current logic file at the monitoring device. In at least one embodiment, each logic statement in a logic file includes a respective timestamp, and the monitoring devices 102 may receive alerts regarding new logic statements or updates to existing logic statements. Accordingly, in querying the remote platform 106 for the new or updated logic, the monitoring devices 102 may parse the logic file based on timestamps associated with individual logic statements to determine the individual logic statements usable to replace current logic statements of the monitoring devices 102.

Continuing with step 210, the updated logic, or the entire logic file, may be retrieved over a secure back-channel communication link, which may be independent from other communications being received and transmitted from the monitoring device 102. As discussed in association with FIG. 1 above, each monitoring device 102 includes a dynamic IP address and a TCP/IP connection to the remote platform 106 over which the monitoring device communicates data such as sensor readings and other parameters. In various embodiments, in response to a monitoring device 102 receiving an alert regarding a logic file update, the monitoring device may establish a back-channel communication link (e.g., an RX/TX session over port 85, or another appropriate port) that is independent from the communication link associated with the dynamic IP address. Accordingly, the monitoring devices 102 may support multiple simultaneous communication channels for at least communicating real-time industrial equipment data readings, as well as for retrieving updated logic files from the remote system 106.

At step 212, the monitoring device 102 replaces the currently stored logic file with the updated logic file retrieved at step 210. In various embodiments, and in response to retrieving the updated logic file, the monitoring devices 102 may store the logic in local memory and either overwrite the prior logic file or store the updated logic file as a newer version of the device configuration logic. Accordingly, in various embodiments, after storing the updated device logic, the process 200 may return to step 202 where the updated device logic (now the current device logic in response to step 212) is executed.

Figure 3:
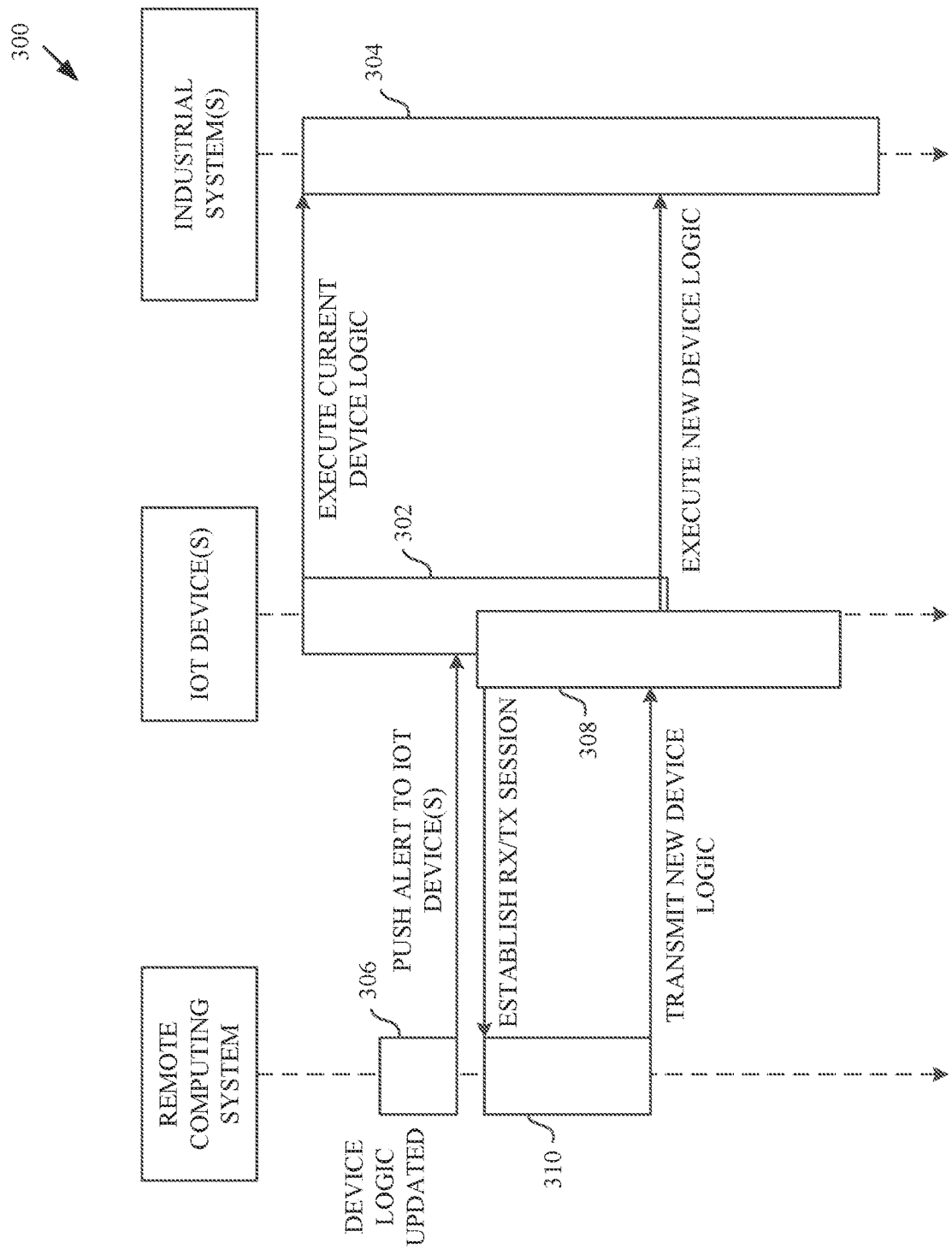
FIG. 3 is a sequence diagram of an exemplary system process, according to one aspect of the present disclosure.

Turning now to FIG. 3, a sequence diagram 300 is shown illustrating communications between a remote computing system (e.g., the remote platform 106), one or more IoT devices (e.g., the monitoring devices 102), and one or more industrial systems (e.g., the industrial equipment at or near which the monitoring devices are located). According to various aspects of the present disclosure, the sequence diagram 300 illustrates exemplary processes and steps occurring at each of the remote computing system, IoT devices, and industrial systems, over an indefinite time length.

In the present embodiment, both the industrial systems and IoT devices are shown running or executing processes concurrently (or simultaneously), indicated by steps 302 and 304. In one embodiment, the step 302 is representative of an IoT device, or monitoring device 102, executing the current logic file stored at the device. In various embodiments, executing the current logic file includes receiving sensor readings/data and other parameters from the industrial systems at which the monitoring devices are located, and furthermore processing the received data. In certain embodiments, processing the received data includes executing the logic file with the received data as input parameters. In various embodiments, step 304 is indicative of the industrial systems operating, and thus generating parameters readable and detectable by the monitoring devices 102. According to various aspects of the present disclosure, step 304 may execute continuously and uninterrupted by other steps in the sequence diagram, as operating the industrial systems is generally a process independent from operating the remote computing system and monitoring devices.

In one embodiment, at step 306, one or more logic files are updated at the remote computing system (e.g., the remote platform 106). As discussed above in association with the description of FIG. 2, updating the device logic may include a system administrator revising prior device logic or generating entirely new device logic. In various embodiments, in response to a system administrator updating device logic and publishing the updated device logic as available for execution, the remote computing system may generate and transmit alerts to the one or more IoT monitoring devices that are running the now outdated device logic. In one embodiment, the alert may be an API call, or the like, transmitted over a TCP/IP-supported communication channel associated with a dynamic IP address, and the alert may include instructions for retrieving the updated device logic file. In certain embodiments, the device logic configurations may include specific instructions to be executed in response to receiving an alert from the remote computing system regarding a logic file update. For example, in particular embodiments, the alert may include additional information other than an indication that an updated logic file is available (e.g., specific API calls to retrieve the updated logic, specific locations in memory at the remote computing system to query for retrieving the updated logic file).

In response to receiving the alert corresponding to updated logic, the IoT device(s) may continue to execute the currently stored logic at step 302; however, at step 308 the IoT devices may concurrently (or simultaneously) establish a new communication session with the remote computing system for retrieving the updated logic file. Accordingly, in various embodiments, at step 308 the IoT monitoring devices that received an alert regarding an updated logic file at the remote computing system may establish a new back-channel communication session with the remote computing system separate from, but executing in parallel with, the communication session between the IoT device(s) and industrial system(s) established at step 302. In various embodiments, the back-channel communication session established at step 308 allows for the IoT monitoring devices to retrieve the updated logic files from the remote computing system while concurrently (or simultaneously) continuing to receive real-time data readings from the industrial systems via the communication session established at step 302.

In response to receiving the updated device logic file at the IoT monitoring devices, the IoT monitoring devices may begin executing the updated logic and subsequently terminate the prior device logic communication session established at step 302. Accordingly, and in various embodiments, the communication sessions established at both steps 302 and 308 may overlap (e.g., execute concurrently) for allowing an uninterrupted communication session between the IoT monitoring devices and industrial systems while a new communication session with the updated logic file is retrieved. In some embodiments, the IoT monitoring device may not terminate the communication session established at step 302, but rather the system may receive the updated logic file and perform a logic file transition, overwrite, or the like.

Figure 4A:
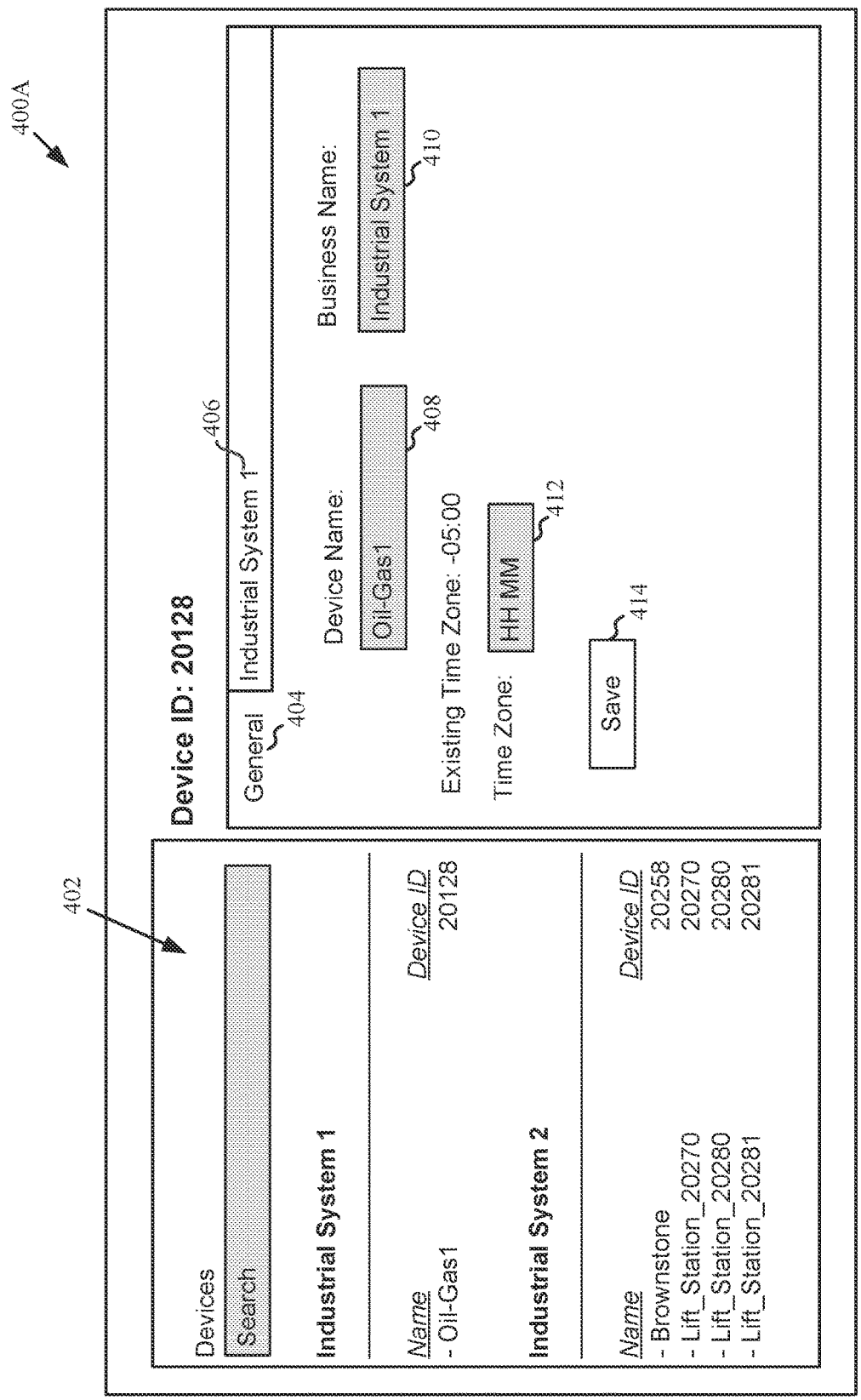
FIG. 4A is a screenshot of a remote platform, according to one aspect of the present disclosure.

Referring to FIG. 4A, a screenshot 400A of a GUI within the remote platform 106 is shown, according to one embodiment of the present disclosure. According to various aspects of the present disclosure, a system administrator may use the GUI to select a monitoring device from a list 402 of a plurality of monitoring devices operatively connected to the remote platform. In certain embodiments, the remote platform may display the list of monitoring devices as being located adjacent to the device configuration tabs, and the monitoring devices within the list 402 may be ordered within the list by name, device ID, and a corresponding device location. In particular embodiments, the system administrator may furthermore configure the selected monitoring device based on available configuration tabs. For example, the present embodiment illustrates two selectable configuration tabs—General configuration tab 404 and Industrial System 1 configuration tab 406. In at least one embodiment, the General configuration tab 404 allows for a system administrator to configure device information such as device name 408, business name 410 (a company, organization, or the like), time zone 412, or other data fields. Furthermore, the monitoring device may include a specific device identification number (as indicated by the Device ID: 20128). According to various aspects of the present disclosure, by a system administrator selecting Save 414, the configuration information established within the General configuration tab 404 may be saved to the respective device's configuration file, or another appropriate location in memory.

Turning now to FIG. 4B, a screenshot 400B of a GUI within the remote platform 106 is shown, according to one embodiment of the present disclosure. As discussed in association with the description of FIG. 4A, a system administrator may use the GUI to select a monitoring device from the list 402 of a plurality of monitoring devices operatively connected to the remote platform, and the system administrator may furthermore configure the selected monitoring device based on available configuration tabs. In at least one embodiment, in response to a system administrator selecting the Industrial System 1 configuration tab 406, the system administrator may be presented with the embodiment as shown in the screenshot 400B. While this screenshot 400B primarily illustrates functionality associated with the logic table 416 configuration tab, the GUI may also allow for a system administrator to configure or monitor specific oil and gas device aspects such as proportional-integral-derivative (PID) controls and control loops (as indicated by the PID Control 418 configuration tab), the device outputs (as indicated by the Outputs 420 configuration tab), and other parameters such as elapsed time or other measurements (as indicated by the Hour Meter 422 configuration tab). In particular embodiments, the GUI may further allow for a system administrator to configure or monitor specific device aspects such as parameters relating to Modbus RTU (remote terminal unit) and/or Modbus TCP (transmission control protocol) device connections. According to various aspects of the present disclosure, and in embodiments in which a particular device may include both Modbus RTU and Modbus TCP device connections, the GUI may include separate configuration tabs for the separate Modbus protocols.

In at least one embodiment, the GUI allows for a system administrator to generate and edit logic statements that configure how the monitoring device responds to certain received inputs (e.g., sensor readings from oil and gas industrial equipment, data from the Modbus RTU and/or Modbus TCP device connections). As shown in the present embodiment, a logic statement 424 for Device ID: 20128 may include at least an input, a logic operator, an input value, an output, an output value, and a comment that explains the logic statement 424 in human readable terms. For example, and referring particularly to the logic statement 424, in response to performing a logical "Equals" on the Input(N) (e.g., Digital Input(1) value) and the Input Value (e.g., True(0)) (which each may correspond to the digital input received on a particular I/O port associated with the monitoring device 20128, or the input value may be hard-coded), if the Input(N) indeed is equal to the Input Value, then the system may be configured to set the Output(M) (e.g., Digital Output(1)) as having the Value "True"). In some embodiments (although not shown in the present embodiment), comments may be added to logic statements defining (in human readable terms) what the logic statement is configured to do. For example, a comment associated with a logic statement may include "turn on a pump if the digital input from a valve sensor is 'high' and thus represents an excess amount of fluid in a container." In various embodiments, this logic statement 424 may relate to a real-world scenario in which certain oil and gas equipment includes two sensors that each measure gas or fluid levels. Accordingly, the digital input (1) as shown in the present embodiment may correspond to the I/O port at which data from the sensor is received, and if the data received from the sensor is a logical 1 or "high" (indicative of detected levels of fluid or gas exceeding an predetermined level or threshold), the monitoring device may initiate for the I/O port to which the pump is operatively connected to receive the output value of logical 1, therefore instructing the pump to turn on. Accordingly, in various embodiments, the GUI illustrated in the screen shot 400B allows for a system administrator to configure logic statements to be executed at monitoring devices operatively connected to industrial equipment, using logic statements and values available via dropdown menus or the like. For most system administrators, this functionality is easier to understand and implement than ladder logic or a similar programming alternative.

In at least one embodiment, the logic statements may be relational, such that an output from a particular logic statement may implicate, or initiate the execution of, one or more separate logic statements. In this way, a plurality of logic statements may be configured to operate as a state machine for dictating not only how a device's logic should be executed at the device, but also how data received from the device should be processed via the remote platform 106.

In response to adding or editing logic statements to the device configuration, selecting the Save & Publish button 426 may finalize the logic statement by mapping the selected inputs and outputs to an XML logic file, or an XML configuration file including a logic table. In various embodiments, the XML logic file may include the logic statements in an organized and transportable structure that is understandable by the monitoring devices that in turn execute the logic statements. Further, in response to publishing additions or edits to logic statements associated with one or more monitoring devices, the logic statements (or the device configuration in its entirety) may receive an updated timestamp, and the remote platform may generate and subsequently transmit a notification to the monitoring devices that updated logic is available for retrieval. As discussed above in association with the description of FIG. 2, in response to receiving a logic update notification, the monitoring devices establish a back-channel communication link to the remote platform for querying databases/memory at the remote platform for logic files with updated timestamps, and furthermore retrieving any updated logic to replace the current logic executing at the monitoring devices. In at least one embodiment, selecting the save button 414 may store the update configuration logic without generating and publishing a notice to the monitoring devices to retrieve the updated logic.

Exemplary Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out concurrently, simultaneously, contemporaneously, or in synchronization with other steps.

CONCLUSION

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method for remotely updating execution logic at a gateway device retrofitted into an industrial equipment environment and operatively configured to monitor a plurality of industrial equipment sensors, the method comprising the steps of:

receiving, at a gateway device, a message transmitted from a remote computing system via a primary TCP/IP network connection between the gateway device and the remote computing system, wherein the primary TCP/IP network connection is primarily configured for the gateway device to transmit, to the remote computing system, raw data detected from a plurality of industrial equipment sensors, and wherein the message comprises an indication of an updated version of the gateway device's execution logic, wherein the updated version is stored at a database operatively connected to the remote computing system;

in response to receiving the message, establishing a secondary TCP/IP network connection with the remote computing system, wherein the secondary TCP/IP network connection is configured to operate independently from, and contemporaneously with, the primary TCP/IP network connection;

retrieving, via the secondary TCP/IP network connection, the updated version of the execution logic from the database, wherein retrieving the updated version of the execution logic comprises:

querying the database for a configuration file associated with a device identification number corresponding to the gateway device, wherein the configuration file comprises the updated version of the execution logic; and determining that the gateway device's execution logic has been updated based at least on a timestamp corresponding to the updated version of the execution logic; and processing the updated version of the execution logic, wherein processing the updated version of the execution logic comprises replacing a current version of the execution logic stored in memory at the gateway device with the updated version of the execution logic.

2. The method of claim 1, wherein the primary TCP/IP network connection corresponds to a first network socket associated with a first network port.

3. The method of claim 2, wherein the secondary network connection corresponds to a second network socket associated with a second network port.

4. The method of claim 3, wherein the secondary network connection comprises a back-channel network connection.

5. The method of claim 3, wherein the first network port comprises port number 80 or port number 443 of the Internet Assigned Numbers Authority (IANA) official assignments of port numbers.

6. The method of claim 3, wherein the second network port comprises port number 85 of the IANA official assignments of port numbers.

7. The method of claim 6, wherein the message comprises a particular port number corresponding to the second network port.

8. The method of claim 1, wherein the message comprising the indication of the updated version of the gateway device's current execution logic is transmitted in response to a user of the remote computing system adding, removing, and/or editing rules within the gateway device's current execution logic via an electronic computing device operatively connected to the remote computing system.

9. The method of claim 1, wherein the gateway device comprises a dynamic IP address.

10. The method of claim 1, further comprising the step of, in response to the gateway device retrieving the updated version of the execution logic from the database operatively connected to the remote computing system, disconnecting from the secondary TCP/IP network connection.

11. A system for remotely updating execution logic at a gateway device retrofitted into an industrial equipment environment and operatively configured to monitor a plurality of industrial equipment sensors, comprising:
- a remote computing system, the remote computing system comprising at least a processor and a database; and
- a gateway device comprising a processing unit and a memory, wherein the processing unit at the gateway device is operatively configured to:
    - receive, at a gateway device, a message transmitted from a remote computing system via a primary TCP/IP network connection between the gateway device and the remote computing system, wherein the primary TCP/IP network connection is primarily configured for the gateway device to transmit, to the remote computing system, raw data detected from a plurality of industrial equipment sensors, and wherein the message comprises an indication of an updated version of the gateway device's execution logic, wherein the updated version is stored at a database operatively connected to the remote computing system;
    - in response to receiving the message, establish a secondary TCP/IP network connection with the remote computing system, wherein the secondary TCP/IP network connection is configured to operate independently from, and contemporaneously with, the primary TCP/IP network connection;
    - retrieve, via the secondary TCP/IP network connection, the updated version of the execution logic from the database, wherein retrieving the updated version of the execution logic comprises:
        - querying the database for a configuration file associated with a device identification number corresponding to the gateway device, wherein the configuration file comprises the updated version of the execution logic; and
        - determining that the gateway device's current execution logic has been updated at least based on a timestamp corresponding to the updated version of the execution logic; and
    - process the updated version of the execution logic, wherein processing the updated version of the execution logic comprises replacing a current version of the execution logic stored in memory at the gateway device with the updated version of the execution logic.

12. The system of claim 11, wherein the primary TCP/IP network connection corresponds to a first network socket associated with a first network port.

13. The system of claim 12, wherein the secondary TCP/IP network connection corresponds to a second network socket associated with a second network port.

14. The system of claim 13, wherein the secondary TCP/IP network connection comprises a back-channel network connection.

15. The system of claim 13, wherein the first network port comprises port number 80 or port number 443 of the Internet Assigned Numbers Authority (IANA) official assignments of port numbers.

16. The system of claim 13, wherein the second network port comprises port number 85 of the IANA official assignments of port numbers.

17. The system of claim 16, wherein the message comprises a particular port number corresponding to the second network port.

18. The system of claim 11, wherein the message comprising the indication of the updated version of the gateway device's current execution logic is transmitted in response to a user of the remote computing system adding, removing, and/or editing rules within the gateway device's current execution logic via an electronic computing device operatively connected to the remote computing system.

19. The system of claim 11, wherein the gateway device comprises a dynamic IP address.

20. The system of claim 11, wherein the processing unit at the gateway device is further operatively configured to disconnect from the secondary TCP/IP network connection in response to retrieving the updated version of the execution logic from the database operatively connected to the remote computing system.

* * * * *